United States Patent
Ciszak et al.

(10) Patent No.: US 8,298,115 B2
(45) Date of Patent: Oct. 30, 2012

(54) WIND TURBINE TRANSMISSION ASSEMBLY

(75) Inventors: Robert John Ciszak, Fairview, PA (US); Keith Marsden, Erie, PA (US); Timothy Kuzma, Cransville, PA (US)

(73) Assignee: General Electric Company, Schenectady, NY (US)

( * ) Notice: Subject to any disclaimer, the term of this patent is extended or adjusted under 35 U.S.C. 154(b) by 586 days.

(21) Appl. No.: 12/333,196

(22) Filed: Dec. 11, 2008

(65) Prior Publication Data

US 2010/0009799 A1    Jan. 14, 2010

Related U.S. Application Data

(60) Provisional application No. 61/079,731, filed on Jul. 10, 2008.

(51) Int. Cl.
*F16H 57/08*    (2006.01)

(52) U.S. Cl. .................................. 475/348; 475/346

(58) Field of Classification Search .................. 474/149, 474/150, 152, 230, 220; 290/40 C, 44, 55; 384/584, 585, 537, 542
See application file for complete search history.

(56) References Cited

U.S. PATENT DOCUMENTS

| | | | | |
|---|---|---|---|---|
| 3,176,172 A * | 3/1965 | Wightman et al. | ............. | 310/89 |
| 5,492,419 A * | 2/1996 | Miller et al. | ................... | 384/551 |
| 6,544,140 B2 * | 4/2003 | Gradu et al. | ................... | 475/246 |
| 6,759,758 B2 | 7/2004 | Torres Martinez | | |
| 7,282,808 B2 * | 10/2007 | Shibata et al. | .................. | 290/55 |
| 7,323,792 B2 | 1/2008 | Sohn | | |
| 7,431,567 B1 | 10/2008 | Bevington et al. | | |
| 7,578,764 B2 * | 8/2009 | Brown et al. | .................. | 475/331 |
| 7,771,308 B2 * | 8/2010 | Willie | ............................ | 475/347 |
| 7,806,799 B2 * | 10/2010 | Smook et al. | .................. | 475/344 |
| 7,828,682 B2 * | 11/2010 | Smook | ............................. | 475/5 |
| 7,828,686 B2 * | 11/2010 | Aiyakkannu | .................. | 475/221 |
| 7,836,595 B1 * | 11/2010 | Ohl, Jr. | .......................... | 29/889.1 |
| 7,861,827 B2 * | 1/2011 | Madge et al. | ................. | 184/6.12 |
| 7,935,020 B2 * | 5/2011 | Jansen et al. | .................. | 475/338 |
| 7,936,080 B2 * | 5/2011 | Bech et al. | ....................... | 290/55 |
| 2005/0082839 A1 * | 4/2005 | McCoin | .......................... | 290/55 |
| 2007/0191171 A1 * | 8/2007 | Pascoe et al. | .................. | 475/230 |
| 2007/0265133 A1 * | 11/2007 | Smook | ........................... | 475/317 |
| 2009/0058094 A1 * | 3/2009 | Jansen et al. | .................... | 290/55 |
| 2009/0224550 A1 * | 9/2009 | Bray et al. | ........................ | 290/55 |
| 2009/0250935 A1 * | 10/2009 | Kim et al. | ........................ | 290/55 |
| 2009/0289461 A1 * | 11/2009 | Larsen | ............................ | 290/55 |
| 2010/0032961 A1 * | 2/2010 | Numajiri | ......................... | 290/55 |
| 2010/0068058 A1 * | 3/2010 | Sorensen | ......................... | 416/41 |
| 2010/0144479 A1 * | 6/2010 | Nakamura et al. | ............. | 475/159 |

* cited by examiner

*Primary Examiner* — Troy Chambers
*Assistant Examiner* — Jude Agendia
(74) *Attorney, Agent, or Firm* — Shawn McClintic; Alleman Hall McCoy Russell & Tuttle LLP

(57) ABSTRACT

A transmission assembly included in a power generation system of a wind turbine, the wind turbine having one or more wind driven rotor blades. The transmission assembly includes a transmission including an input carrier and a gear-train rotatably coupling the input carrier to a transmission output, the input carrier configured to transfer a rotational input from the rotor blades to the gear-train and a removable input bearing cartridge coupled to a periphery of the input carrier, exterior to the gear-train, the removable bearing cartridge in axial alignment with the input carrier.

21 Claims, 5 Drawing Sheets

WIND TURBINE TRANSMISSION ASSEMBLY

CROSS-REFERENCE TO RELATED APPLICATIONS

The present application claims priority to U.S. Provisional Patent Application Ser. No. 61/079,731, entitled "Single Bearing Application Differential Planetary Gearbox", filed Jul. 10, 2008, the disclosure of which is hereby incorporated by reference.

BACKGROUND

Increasing demand for clean renewable energy has led to rapid growth of the wind turbine industry. Standardization of various components included in wind turbines has been slow to catch on, due to the rapid growth. Many smaller manufacturers order small production runs of components, such as transmissions, designed to meet individual specifications, necessitating a unique manufacturing process. Some transmission manufacturers have made attempts to include an integrated bearing, receiving the majority of the loads from the rotor blades and the rotor head, into the transmission, decreasing the transmissions modularity. The integrated bearing may be positioned at various locations within the transmission, preventing easy installation. Consequently, removal and repair of the bearing may be difficult and laborious. The decreased modularity, as well as the difficult installation and removal process, may considerably increase the cost of the transmission.

BRIEF DESCRIPTION OF THE INVENTION

The inventors have recognized a solution to the aforementioned problem, such as in one approach relating to a transmission assembly included in a power generation system of a wind turbine, where the wind turbine has one or more wind driven rotor blades. The transmission assembly comprises a transmission that includes an input carrier and a gear-train rotatably coupling the input carrier to a transmission output. The input carrier is configured to transfer a rotational input from the rotor blades to the gear-train. The transmission assembly further comprises a removable input bearing cartridge coupled to a periphery of the input carrier, exterior to the gear-train. In one embodiment, the removable input bearing cartridge is in axial alignment with the input carrier.

In this way, the removable input bearing cartridge may be installed subsequent to assembly of the transmission, thereby increasing the modularity of the transmission and allowing the transmission to be used in a multitude of wind turbine designs. Also, the installation and removal process is simplified, decreasing the cost of installation as well as repair.

Additionally, modifications to the bearing cartridge to account for various design requirements in a multitude of wind turbines may be performed at the end of the manufacturing process or during on-site installation, allowing for more standardized manufacturing processes.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Also, the inventors herein have recognized any identified issues and corresponding solutions.

BRIEF DESCRIPTION OF FIGURES

The present invention will be better understood from reading the following description of non-limiting embodiments, with reference to the attached drawings, wherein below.

DETAILED DESCRIPTION

Figure 1:
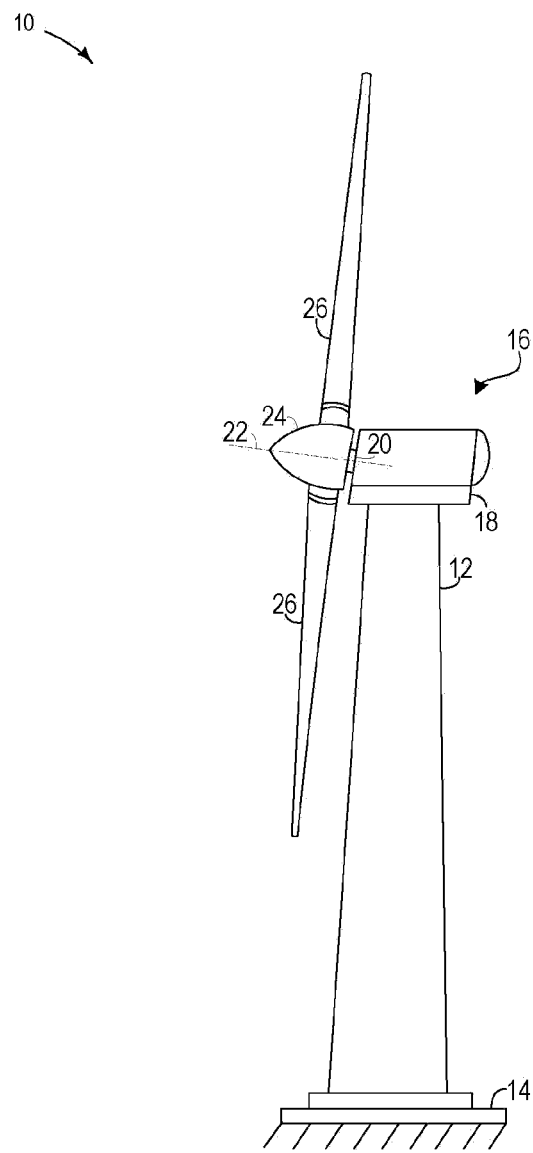
FIG. 1 shows an illustration of a wind turbine.

A wind turbine 10 is shown in FIG. 1. The turbine includes a tower 12 extending substantially vertically out of a base 14. The tower may be constructed from a plurality of stacked components. However, it can be appreciated that alternate configurations of the tower are possible, such as a lattice tower. A nacelle 16 and nacelle bedplate 18 are positioned atop the tower. A drive unit (not shown) may be included in the nacelle bedplate, allowing the nacelle to rotate about a horizontal plane. The nacelle may be positioned, by the drive unit, directly into the wind, increasing the power output of the wind turbine. Further in some examples, a drive unit controls the vertical pitch of the blades. The nacelle houses a power generation system having a transmission and a generator, shown in FIG. 2, discussed in greater detail herein. Further, various power electronics and control electronics may be housed in the nacelle 16.

A main shaft 20 extends out of the nacelle. The main shaft may be coupled to a transmission by an input carrier (not shown in FIG. 1) sharing a common central axis 22 with the main shaft. Furthermore, the main shaft 20 may be coupled to a rotor head 24. A plurality of rotor blades 26 may be radially position around the rotor head 24. A wind force (not shown) may act on the rotor blades, rotating the blades and therefore the rotor head about the central axis. Thus, the rotor head is wind driven. The rotor head may be configured to reduce drag on the wind turbine, thereby reducing the axial load (e.g., thrust) on bearings in the wind turbine.

Figure 2:
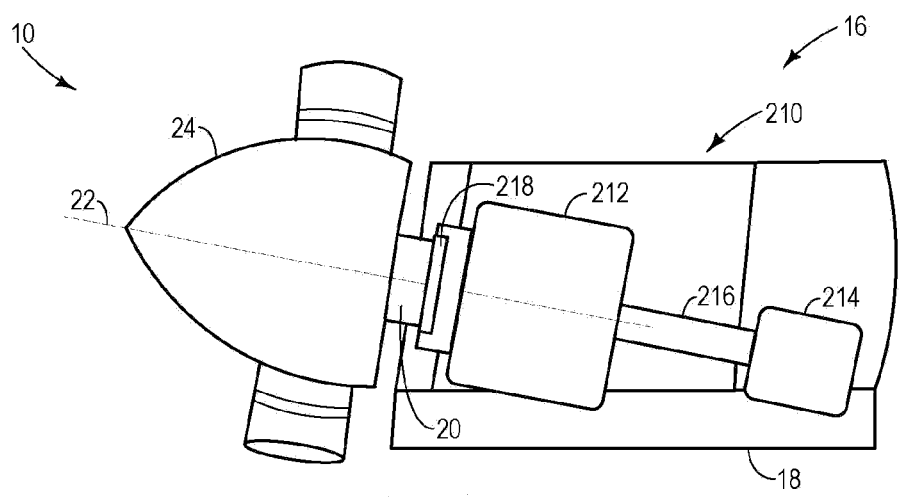
FIG. 2 shows a power generation system enclosed by a nacelle.
Figure 3:
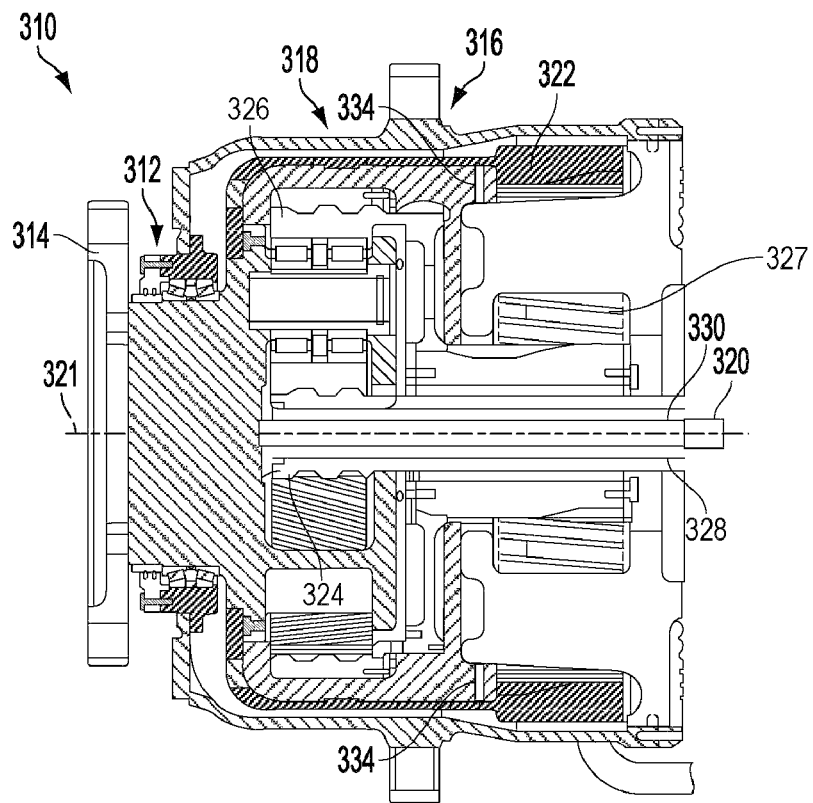
FIG. 3 illustrates a cut away side view of a transmission assembly, according to an embodiment of the present invention.

FIG. 2 shows a detailed illustration of nacelle 16 housing a transmission assembly 212 included in a power generation system 210 of the wind turbine 10. The power generation system 210 is configured to efficiently convert rotational energy from the wind driven rotor blades 26 to electrical energy. The power generation system may include the transmission assembly 212 configured to increase the rotational speed of the main shaft 20 and a generator 214 configured to convert mechanical energy from the transmission assembly into electrical energy. The transmission assembly may be coupled to the generator via an output 216. In this example the output is an output shaft. However, in other examples the output is another suitable apparatus. A more detailed illustration of the transmission assembly is shown in FIG. 3.

The transmission assembly 212 is configured to adjust the speed and torque of the rotational input from the wind actuated rotor head 24, allowing the generator 214 to more efficiently utilize the rotational energy from the transmission assembly to extract electrical power from the power generation system. For instance, the transmission assembly may increase the speed of the rotational input, while reducing torque.

The transmission assembly 212 may include an input bearing cartridge 218. The transmission assembly may further include a transmission 316 having a gear-train 318, shown in FIG. 3. Returning to FIG. 2, the bearing cartridge 218 may be removable, in that it may be installed and removed from the transmission subsequent to assembly of the transmission. Further, the removable input bearing cartridge 218 may include a suitable bearing such as a tapered roller bearing, allowing the bearing to accept the majority of the radial and axial loads from the rotor head and rotor blades. Therefore, the transmission of loads from the rotor blades and rotor head into the gear-train is substantially decreased or eliminated, allowing the transmission assembly to be used in a greater number of wind turbines, thereby increasing the transmission assembly's modularity. It can be appreciated that other types of bearings may be utilized, such as a double row tapered roller bearing, standard roller bearing, etc. Furthermore, due to the location and configuration of the input bearing cartridge, up-tower repair of both the removable bearing cartridge and the transmission can be performed, decreasing repair cost. Various detailed illustrations of the bearing cartridge are shown in FIGS. 3-7, discussed in greater detail herein. The illustrations in FIGS. 3-7 are drawn approximately to scale.

A number of suitable transmissions having an input and an output may be utilized. Specifically, in this example a planetary gearbox is utilized. However, other suitable transmissions may be utilized, such as differential planetary gearboxes, gearboxes with axially aligned input and output axes of rotation, or gearboxes having parallel output shafts.

Various types of generators may be used in the wind turbine, such as an induction type, wound type, synchronous type, secondary resistance control wound induction type (rotor current control or RCC type), secondary excitation control wound induction type (static Scherbius or D.F. type), permanent magnet type, induction multiple type, etc. Additionally, the generator may be coupled to an electrical transmission system, which may be routed through the tower to the base.

It can be appreciated that additional up-tower components may be included in the nacelle 16, such as electrical transmission components (such as a transformer), a generator cooling system (such as an open or closed loop heat exchanger), a transmission lubrication system, etc.

As described herein, upwind may refer to a longitudinal direction pointing toward the rotor blades and downwind may refer to a longitudinal direction pointing the opposite way. Furthermore, upwind and downwind components may be used to define the relative position of components included in the transmission, bearing cartridge, etc.

FIG. 3 shows a cut away side view of a transmission assembly 310. The transmission assembly 310 shown in FIG. 3 may be similar to the transmission assembly 212 shown in FIG. 2. The transmission assembly 310 includes a removable input bearing cartridge 312, discussed in more detail herein with regard to FIGS. 5-7. The removable input bearing cartridge 312 is coupled to the periphery of an input carrier 314. The removable input bearing cartridge may be in axial alignment with the input carrier 314. The input carrier 314 is included in a transmission 316 having a gear-train 318 rotatably coupling the input carrier 314 to an output 320. The input carrier is upwind of the output 320. In this example, the transmission is a planetary gearbox having a central axis of rotation 321. However, it can be appreciated that an alternate suitable transmission may be utilized.

The planetary gearbox may include a ring gear 322, a plurality of planet gears, and a sun gear 324. In this example, the input carrier 314 is coupled to the ring gear 322 and a first set of planet gears 326, thereby driving the gear-train. However, it can be appreciated that alternate configurations are possible. The first set of planet gears 326 may be in meshing engagement with the sun gear 324. The ring gear 322 may be in meshing engagement with a second set of planet gears 327. Further, the second set of planet gears 327 may be in meshing engagement with the sun gear. The sun gear may be coupled to a central rotating shaft 328 rotating about the central rotating axis 321. Additionally, the central rotating shaft may be coupled to the output 320. Each of the meshing gear engagements, including between the ring gear and the planet gears, as well as between the planet gears and the sun gear, may be a helical meshing engagement.

Also, a pitch control tube 330 is shown directed through the center of the generator and the transmission (e.g., through the rotor, transmission output, and transmission input), along the central rotating axis 321. In this way, the pitch control tube traverses from the transmission input through the generator and is inside the center of the planetary transmission. The pitch control tube may include various conduits (not shown), such as electric wires and/or hydraulic lines, and is configured to adjust the orientation (e.g., pitch) of the rotor blades. The conduits may be coupled to a suitable controller (not shown) located in the rotor hub, nacelle, or at a down-tower location. A torque tube 334 may also be included in the gear-train. The torque tube may be configured to transfer torque from the input carrier to various components included in the gear-train.

Further, it can be appreciated that alternate bearings may be included in the transmission (e.g., gearbox). For example, one or more planet bearings may be included in the gear-train for allowing the planet gears to orbitally rotate about the sun gear. Additionally, a bearing (not shown) may be included near the output to receive loads, thereby supporting the gear-train and/or generator. In this example, the input bearing serves as the primary support for the input carrier.

The design of the transmission assembly, in particular the design of the input bearing cartridge positioned exterior to the gear-train, simplifies the manufacturing, installation, removal, and repair process when compared to bearings used in prior art transmission designs which integrate the bearing into the gear-train. In this way, the cost of the transmission assembly and therefore of the wind turbine is decreased.

Lubrication may be provided to various components in the transmission assembly, such as the input bearing cartridge, decreasing the friction between the components during operation as well as dissipating the thermal energy produced in rotation. A suitable lubricating fluid such as high viscosity oil may be utilized.

Figure 4:
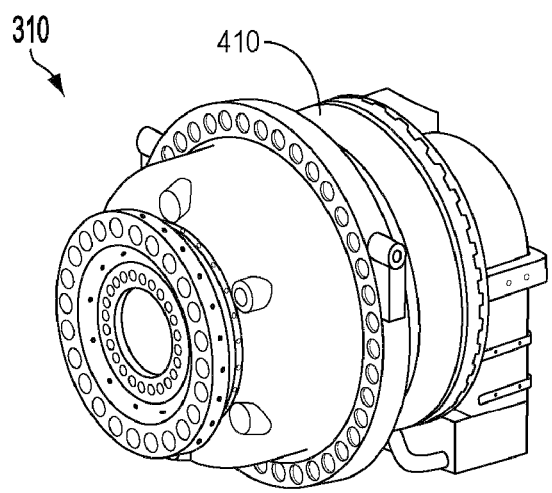
FIG. 4 shows an isometric view of the transmission assembly shown in FIG. 3.

FIG. 4 shows an isometric view of the transmission assembly 310 including a transmission housing 410 surrounding at least a portion of the transmission.

Figure 5:
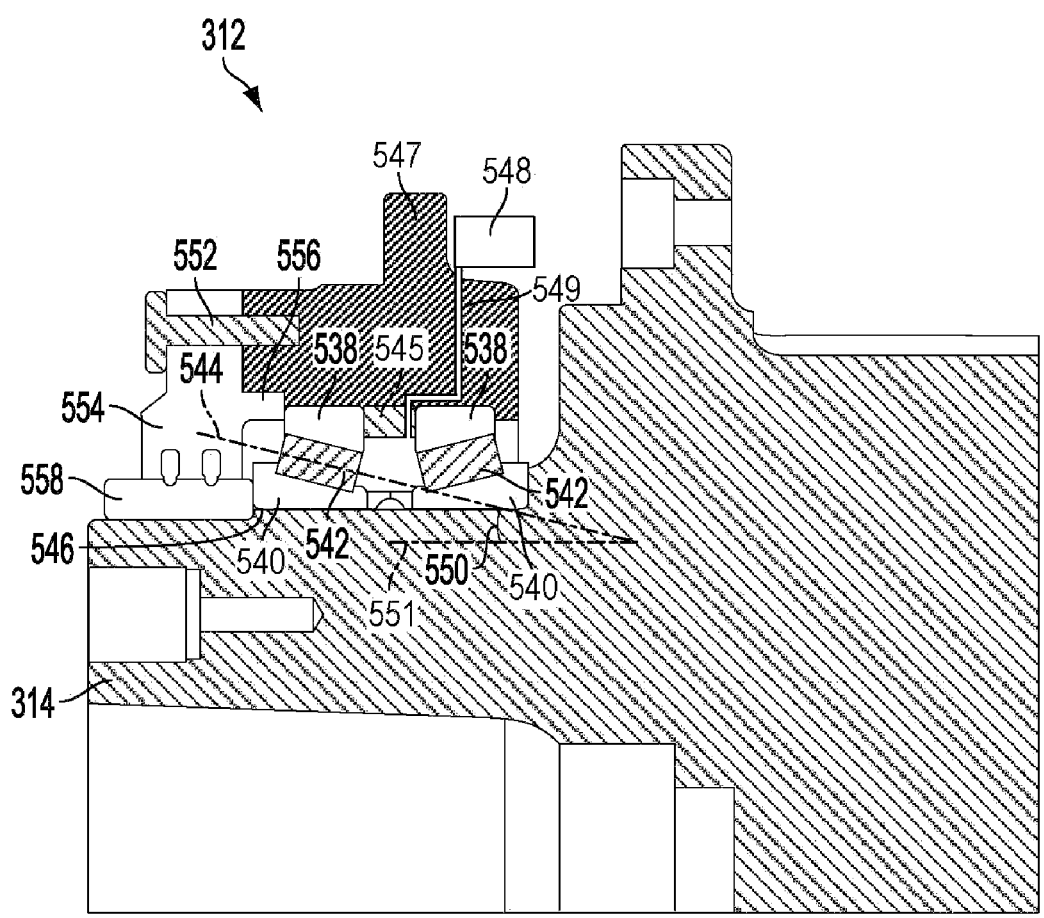
FIG. 5 illustrates a detailed view of an input bearing cartridge and an input carrier included in the transmission assembly, shown in FIG. 3.
Figure 6:
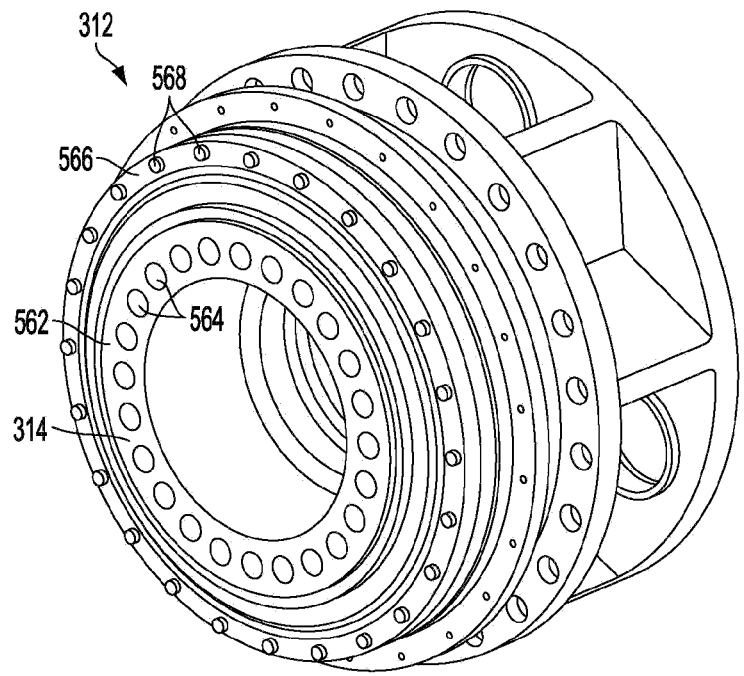
FIG. 6 illustrates an isometric view of the input bearing cartridge and the input carrier shown in FIG. 5.
Figure 7:
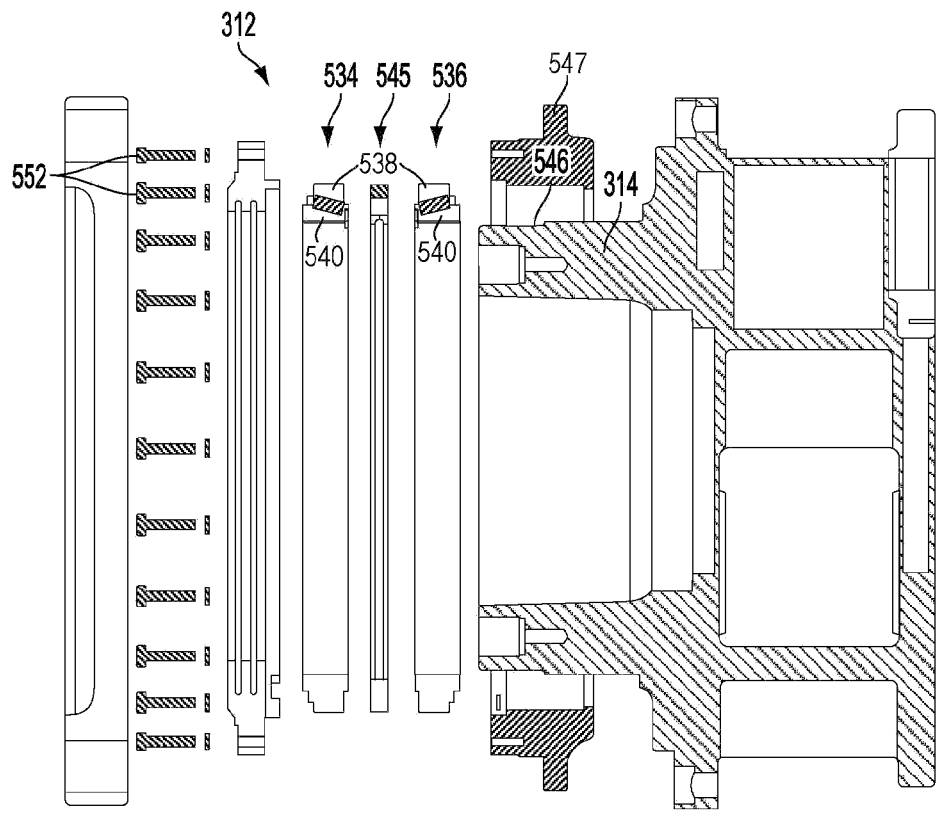
FIG. 7 shows an exploded view of the bearing cartridge and the input carrier shown in FIG. 5.

Various detailed views of the input carrier 314 and the bearing cartridge 312 are shown in FIGS. 5-7. FIG. 5 shows a cut away view of an assembled bearing cartridge and input carrier. FIG. 7 shows an exploded view of the bearing cartridge and input carrier. FIG. 6 shows an isometric view of an assembled bearing cartridge and input carrier.

As shown in FIG. 7, the bearing cartridge 312 may include two bearing rows, an upwind bearing row 534 and a downwind bearing row 536. Each of the bearing rows may include an inner and an outer race, 540 and 538 respectively, at least partially enclosing a plurality of rollers 542. In other examples, the bearing rows may include the outer race and the rollers. In this example, the rollers are cylindrical. However, in other examples the rollers may be spherical or conical. Each roller may have an axis of rotation 544, as shown in FIG. 5, about which the rollers rotate during operation of the wind turbine. A spacer 545 may be interposed between the upwind bearing row 534 and the downwind bearing row 536, allowing the loads on the bearing rows to be properly distributed.

The inner race 540 may be coupled to an exterior surface 546 of the input carrier. The outer race 538 may be coupled to a portion of the transmission housing. In this way, the input bearing cartridge 312 may allow the input carrier 314 to rotate about a central rotating axis. A lubrication fluid, such as oil, may at least partially surround the rollers, decreasing the wear on the rollers and the inner and outer race. Additionally, a suitable bearing spacer may be interposed between the upwind bearing row and the downwind bearing row.

A bearing housing 547, shown in FIGS. 5 and 7, may be included in the input bearing cartridge. The bearing housing 547 is coupled to and at least partially surrounds the outer races. The bearing may be configured to couple to a stationary transmission housing (not shown) attached to the nacelle through a suitable coupling apparatus. In this way, the bearing housing and the outer races act as a stator. In other examples, the outer race may include the bearing housing. The bearing housing 547 may include holes configured to receive various attachment mechanisms such as bolts, shoulder bolts, etc. The bolt holes may be positioned such that various components, for example the bearing cap discussed in greater detail herein, may be coupled to the bearing housing.

In some examples, the bearing housing may contain at least a portion of a lubrication system 548. The lubrication system may include one or more supply passage(s) 549 and/or one or more drain passage(s) (not shown). The supply passage(s) and/or drain passage(s) may extend through various components included in the bearing cartridge, such as spacers, to provide various rotating components in the bearing with lubrication fluid. It can be appreciated that a pump may be fluidly coupled to the supply passage(s) and/or the drain passage(s) to provide pressurized lubrication fluid.

Furthermore, the bearing rows 534, 536 may be tapered. A taper angle of the bearing cartridge may be the angle 550 defined by the intersection of the axis of rotation 544 of one or more of the rollers 542 included in a bearing row and a line 551 substantially parallel to the central axis of rotation 321 of the transmission (e.g., input carrier). A taper angle 550, defined by the intersection of an axis of rotation 544 of a roller included in the upwind row and line 551, is illustrated in FIG. 5. It can be appreciated that the downwind row may also have a taper angle, which may be substantially equivalent to the taper angle 550 or may be another suitable angle.

As shown in FIG. 5, a stator shim 554 may be coupled to the outer race of the first and second bearing rows using suitable coupling hardware 552, such as bolts. An extended section 556 of the stator shim may be configured to clamp the outer race of the upwind row as well as the bearing housing. The contacted surfaces of the stator shim and the outer race mate to form a static oil seal, preventing oil from leaking out of the input bearing cartridge. A rotor shim 558 is coupled to the input carrier and the upwind bearing row 534. The rotor shim may be positioned to maintain a desired end play for the input carrier. An additional coupling apparatus (not shown) may be attached to the rotor shim and the input carrier for clamping the rotor shim to the input carrier.

The input bearing cartridge 312 is configured to axially and radially support the input carrier 314. Support may include receiving at least a portion of the loads generated by or transferred to a component. Due to the configuration of the transmission, assembly loads from the rotor head, main shaft, and/or the transmission, shown in FIGS. 1 and 2, may be transferred to the input carrier. Additionally, the input bearing cartridge allows the input carrier to rotate. Consequently, during operation of the wind turbine, the input carrier may receive rotational input from the main shaft 20, shown in FIGS. 1 and 2, and initiate rotation of the gear-train, thereby initiating electrical power generation in the wind turbine. The input bearing cartridge may receive the majority of the loads generated by the wind (i.e., loads from the rotor head) through the input carrier. Consequently, the wind loads from the rotor blades and rotor head are not translated to the gear-train included in the transmission, decreasing the wear on the gear-train. Thus, the gear-train may be used in numerous wind turbines having different designs.

The input carrier 314 may include a coupling interface 562, as shown in FIG. 6, configured to couple the input carrier to the main shaft. The coupling interface may be configured to couple to the main shaft by suitable coupling hardware (not shown), such as bolts extending through bored holes 564. Additionally, a bearing cap 566, shown in FIG. 6, may be coupled to the bearing housing 547 using hardware 568. The bearing cap prevents unwanted particulates from entering the input bearing cartridge and acts as a seal for lubrication. In some examples, the coupling interface may be upwind of the input bearing cartridge. In other examples, the coupling interface may be positioned at another suitable location.

Various design features of the input bearing cartridge, such as the taper angle, may be adjusted based upon the design specification of the rotor head, nacelle, etc. Additionally, the bearing settings may also be adjusted to meet specific design requirements. The bearing settings include at least one of the following: the position of the bearing rows, the input bearing cartridge position, the position of one or more shims, and/or the spacer size and/or position. Thus, the transmission may be adapted for use in a multitude of wind turbine designs, decreasing the cost of manufacturing. The design specifications of the rotor head include static and dynamic loading characteristics. For example, the tapered angle may be increased to account for increased thrust load on the bearing.

Figure 8:
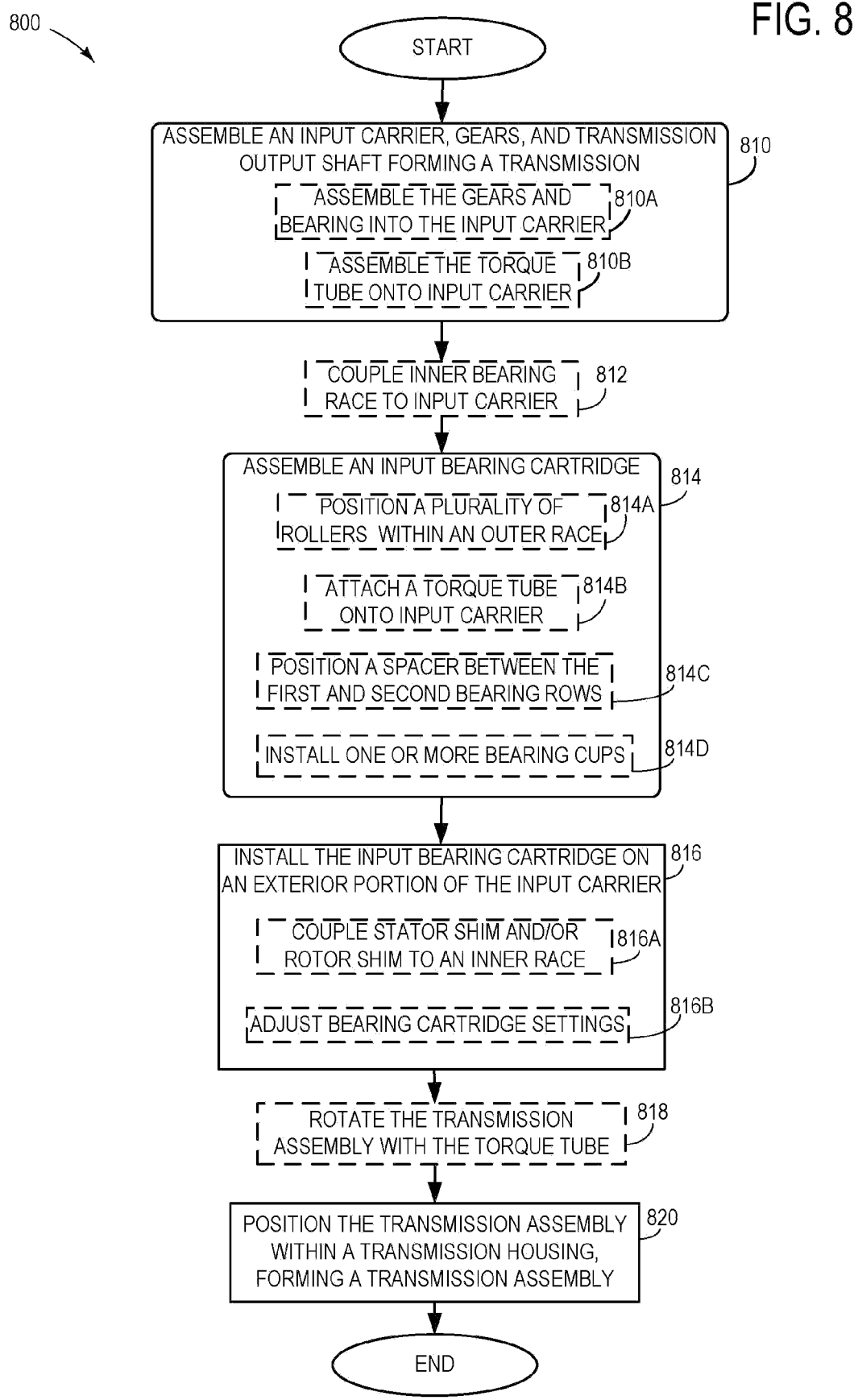
FIG. 8 shows a method which may be used to assemble a transmission assembly.

FIG. 8 illustrates a method 800 for manufacturing of a transmission assembly. The transmission assembly may include an input carrier, an output shaft, and a plurality of gears included in a gear-train of a transmission. The gear-train is configured to increase the rotational speed of the output shaft. In some examples, the transmission assembly is a planetary gearbox assembly. The disclosed method may be used to manufacture the transmission assembly 310, shown in FIGS. 3-7, utilizing the components discussed above. Alternatively, the disclosed method may be used to manufacture another suitable transmission assembly.

First at 810 the method includes assembling an input carrier, gears, and an output forming a transmission, with the transmission having a central rotating axis. Assembling the gear-train may include assembling the gears and associated bearings, such as planet gear bearings, into an input carrier, at 810A. The gears may include a plurality of planet gears, a ring gear, and a sun gear. Optionally, assembling the gear-train may include assembling the torque tube onto the input carrier, at 810B. In some examples, the gear-train may be assembled in a separate facility or location.

Optionally, at 812 the method may include coupling an inner bearing race to the input carrier. In other examples, the inner bearing race may be included in the input bearing cartridge.

At 814, the method includes assembling an input bearing cartridge. Assembling the input bearing cartridge may include at 814A positioning a plurality of rollers within an outer race of a first and/or a second bearing row. It can be appreciated that in some examples the input bearing cartridge may include a single bearing row. Also, at 814B the method may include attaching a torque tube onto the input carrier. Additionally, at 814C the method may include positioning a spacer between the first and second bearing rows. Further, in some examples the method at 814D may include installing one or more bearing cups.

At 816 the method includes installing the input bearing cartridge on a peripheral or exterior portion of the input carrier. Installing may include coupling. Suitable assembly hardware, such as bolts, may be used to install the input bearing cartridge on the input carrier. In some examples, installing the input bearing cartridge to the input carrier may include coupling a bearing cap to a stator shim and/or coupling a rotor shim to an inner race, at 816A. In this way a lubrication seal may be formed, impeding lubrication fluid, such as oil, from exiting the input bearing cartridge, sealing the input bearing cartridge. Additionally, installing the input bearing cartridge may include adjusting the bearing cartridge settings at 816B. The bearing settings may include the positioning of various components included in the input bearing cartridge to allow loads on the bearing to be properly distributed, decreasing the wear on the input bearing cartridge during operation. Further in some examples, installing the input bearing cartridge may include installing one or more bearing cones through suitable coupling hardware.

In some examples the method may include rotating the transmission assembly with the torque tube, at 818. The rotation may include 180° of rotation. Next, at 820, the method may include positioning the transmission assembly within a transmission housing, forming a transmission assembly. The method may further include removing the input bearing cartridge from the transmission assembly and repairing or replacing the input bearing cartridge. This may occur subsequent to on site construction of a wind turbine when maintenance may be needed. Also, the removal of the input bearing cartridge may occur at an up-tower location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A transmission assembly for inclusion in a power generation system of a wind turbine, having one or more wind driven rotor blades, the transmission assembly comprising:
   a transmission including an input carrier and a gear-train rotatably coupling the input carrier to a transmission output, the input carrier configured to transfer a rotational input from the rotor blades to the gear-train; and
   a removable input bearing cartridge coupled to a periphery of the input carrier, exterior to the gear-train, wherein the removable input bearing cartridge supports the input carrier, and wherein the input carrier and an output of the transmission are located on a common central rotating axis, and the input carrier is in axial alignment with the input bearing cartridge and positioned radially inwards therefrom, wherein the input carrier is coupled to a main shaft upwind from the removable input bearing cartridge and downwind from the one or more rotor blades.

2. The assembly of claim 1 wherein the removable input bearing cartridge is removable from the periphery of the input carrier without removing the input carrier from the gear-train.

3. The assembly of claim 1 wherein the input carrier is coupled to a plurality of planet gears included in the gear-train.

4. The assembly of claim 3 wherein the input carrier is coupled to a ring gear included in the gear-train.

5. The assembly of claim 1 wherein the input bearing cartridge includes at least one inner race and one outer race surrounding at least one row of rollers.

6. The assembly of claim 5 wherein the input bearing cartridge includes a spacer interposed between an upwind bearing row and a downwind bearing row.

7. The assembly of claim 5 wherein the rollers are cylindrical in shape.

8. The assembly of claim 5 wherein the input bearing cartridge includes a rotor shim coupled to the inner race of the input bearing cartridge and a stator shim coupled to the outer race of the input bearing cartridge.

9. The assembly of claim 1 wherein the input bearing cartridge is in axial alignment with the input carrier and axially and radially supports the input carrier.

10. A method for construction of a planetary gearbox assembly having an input carrier, an output shaft, and a plurality of gears included in a gear-train of a transmission, the gear-train configured to increase rotational speed of the output shaft, the method comprising:
    assembling the input carrier, gears, and output shaft forming the transmission having a central rotating axis;
    assembling an input bearing cartridge;
    installing the input bearing cartridge on an exterior portion of the input carrier in a manner allowing the input bearing cartridge to be removed from the exterior portion of the input carrier without removing the input carrier from the gear-train;
    sealing the input bearing cartridge;
    positioning the transmission and input bearing cartridge at least partially within a transmission housing and coupling a portion of the input bearing cartridge to the transmission housing, forming the planetary gearbox assembly; and
    coupling the input carrier to a main shaft upwind from the input bearing cartridge and downwind from one or more rotor blades.

11. The method according to claim 10 wherein the gears include planet gears.

12. The method according to claim 10 further comprising adjusting a setting of the input bearing cartridge prior to sealing the input bearing cartridge.

13. The method according to claim 10 wherein assembling the gear-train includes coupling the input carrier to a plurality of planet gears in meshing engagement with a sun gear, the sun gear coupled to the output shaft.

14. The method according to claim 10 wherein the input bearing cartridge is assembled at a separate location from the transmission.

15. The method according to claim 14 wherein assembling the input bearing cartridge includes coupling a stator shim to an outer race of the input bearing cartridge and coupling a rotor shim to an inner race of the input bearing cartridge to seal the input bearing cartridge.

16. The method according to claim 10 further comprising removing the input bearing cartridge and replacing the input bearing cartridge.

17. The method according to claim 16 further comprising removing the input bearing cartridge from the planetary gearbox assembly at an up-tower location.

18. The method according to claim 10 wherein the input bearing cartridge includes at least two rows of tapered cylindrical rollers configured to receive axial and radial loads from the input carrier and a rotor head.

19. A transmission assembly for inclusion in a wind turbine, the transmission assembly comprising:
a planetary gearbox including an input carrier configured to rotate about a central axis and a gear-train configured to increase a speed of rotation of the input carrier, the input carrier coupled to one or more planet gears and a ring gear included in the gear-train; and
a removable input bearing cartridge coupled to the input carrier, exterior to the gear-train and removable from a periphery of the input carrier without removing the input carrier from the gear-train, the input bearing cartridge having two rows of tapered roller bearings;
wherein the removable input bearing cartridge radially and axially supports the input carrier, and wherein the input carrier is in axial alignment with the input bearing cartridge and positioned radially inwards therefrom, and the input carrier is coupled to a main shaft at a location between the removable input bearing cartridge and one or more rotor blades.

20. The transmission assembly of claim 19 wherein the input bearing cartridge includes a bearing housing containing at least a portion of a lubrication system configured to supply the input bearing cartridge with lubrication fluid.

21. The transmission assembly of claim 20, further comprising a bearing cap coupled to the bearing housing and configured to prevent unwanted particulates from entering the input bearing cartridge.

* * * * *